UNITED STATES PATENT OFFICE 2,525,075

PREPARATION OF THIOAMIDES

Charles L. Levesque, Philadelphia, Pa., assignor to Rohm & Haas Company, Philadelphia, Pa., a corporation of Delaware No Drawing. Application June 17, 1948, Serial No. 33,679

7 Claims. (Cl. 260—551)

This invention relates to a method for preparing thioacetamides and dithiooxalodiamides having, respectively, the general formulas

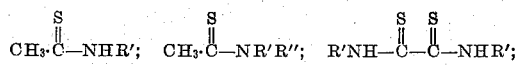

and

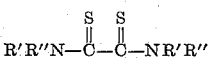

in which R' and R'' represent monovalent groups or radicals as described in greater detail below.

The invention relates to a process which comprises reacting under anhydrous conditions and at a temperature of 80° C. to 300° C. (a) acetylene, (b) sulfur, and (c) an amino compound from the class consisting of ammonia and primary and secondary amines. The amino compounds which are operable have the general formula R'R''NH wherein R' and R'' represent hydrogen atoms or monovalent groups, preferably hydrocarbon radicals, from the class consisting of alkyl, cycloalkyl, and aralkyl groups.

The reactions which take place are believed to follow the course set forth in the following equations:

1. 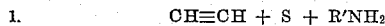

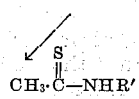

2. 

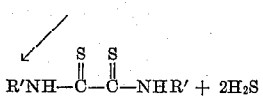

3. 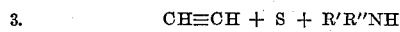

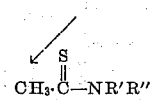

4. 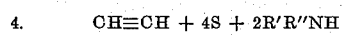

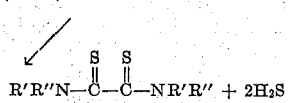

This invention is based on the discovery of a new chemical reaction in which acetylene, sulfur, and an amino compound react to form thioacetamides and dithiooxalodiamides. This new type of reaction gives rise to a large number of products which differ from each other in two ways. Thus, they can be thioacetamides or dithiooxalodiamides, and ordinarily a mixture of these two is obtained. Furthermore, they can differ in regards to the particular groups, which are attached to the amino-nitrogen atoms and which are represented by R' and R'' above.

When the characters R' and R'' represent hydrogen atoms, the amino compound, of course, is ammonia and the products of reaction are thioacetamide and dithiooxalodiamide per se. When one of the characters, R' or R'', represents an organic radical and the other a hydrogen atom, as is the case with primary amines, the products are mono-N-substituted thioacetamides and dithiooxalodiamides. It follows that, when both R' and R'' represent organic radicals, preferably hydrocarbon radicals, the amine is a secondary one; and the products are di-N-substituted. Thus, the structure of the product is directly dependent upon the structure of the amino compound which is employed as reactant. The amines which react well and are preferred are those in which R' and R'' are hydrocarbon radicals or groups from the class consisting of alkyl, cycloalkyl, and aralkyl radicals. R' and R'' can represent the same or different hydrocarbon groups within the classes noted above. Examples of operable amines include the following: Methylamine, dimethylamine, methylethylamine, laurylamine, butyloctylamines, octadecylamines, dioctadecylamines, cyclohexylamine, dicyclohexylamine, methylcyclohexylamine, ethylbenzylamine, beta-phenethylamine, di-beta-phenylamine, and the like.

Both thioacetamides and dithiooxalodiamides are produced by the process of this invention. The relative yields of each is determined largely by the duration of the reaction. It is believed that the thioacetamide is first formed and that this in turn reacts with additional sulfur and amine to form the corresponding dithiooxalodiamide. This belief is supported by the fact that a thioacetamide reacts with sulfur and an amino compound to form the corresponding dithiooxalodiamide.

The reaction which takes place at temperatures from 80° C. to 300° C., and preferably from 100° C. to 150° C., may be carried out in the presence of an anhydrous solvent such as dioxane or pyridine. The reaction is always conducted under substantially anhydrous conditions.

It is also desirable to employ an excess of sulfur and the amino compound over that amount required by the reactions set forth in Equations 1 to 4 above. When gaseous or low-boiling reactants, such as ammonia or methylamine, are employed, it is obviously advantageous to carry out the reaction under pressure although in such cases adequate consideration must be given to the hazards attending the use of acetylene under pressure.

The process of this invention is illustrated by the following examples:

*Example 1*

In a four-necked flask equipped with stirrer, thermometer, reflux condenser, and gas disperser was placed 198 grams of cyclohexylamine. Acetylene was passed into the amine until the latter was saturated. Then 106 grams of sulfur and 150 cc. of dioxane were added, and the mixture was heated to refluxing temperature. Refluxing was continued for three hours, during which time a slow stream of acetylene was passed into the reaction mixture. Thereafter the passage of acetylene was discontinued while the mixture was refluxed for an additional two hours. The dioxane was then removed by distillation under vacuum. The semi-solid residue was extracted with 500 cc. of boiling ethanol and filtered. The residual solid was then taken up in 250 cc. of boiling butanol, and the solution was filtered. The filtrate, on cooling, deposited 11 grams of bright orange crystals of N,N'-dicyclohexyldithiooxalodiamide, which melted at 156–158° C. and which caused no depression in the melting point of an authentic sample of N,N'-dicyclohexyldithiooxalodiamide when mixed therewith. A small amount of cyclohexylthioacetoamide was isolated from the ethanol filtrate above.

*Example 2*

By the process of Example 1, 350 cc. (1.5 moles) of dodecylamine, acetylene and 82 g. (2.6 moles) of sulfur were reacted in the presence of 100 cc. of dioxane at refluxing temperature for five hours. After removal of the dioxane, the residue was taken up in 400 cc. of boiling butanol and the solution was filtered. When the butanol solution was cooled, there separated waxy, orange crystals which, on being separated and dried, weighed 34.5 grams and had a melting point of 50.3°–51.4° C. A mixed melting point with an authentic sample of N,N'-di-dodecyldithiooxalodiamide showed no depression. Partial evaporation of the butanol solution resulted in another crop of crystals which, when dry, weighed 11.0 grams, melted at 48.5°–50.0° C., and were identified as N,N'-di-dodecyldithiooxalodiamide.

The thioamides of this invention are useful as chemical intermediates, insecticides, and accelerators.

I claim:

1. The process of preparing a mixture of a thioacetamide and a dithiooxalodiamide having respectively the formulas

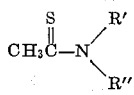

and

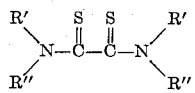

in which R' and R'' in all occurrences are the same members of the class consisting of hydrogen atoms and alkyl, cycloalkyl, and aralkyl radicals, which process comprises heating under anhydrous conditions at a temperature from 80° C. to 300° C. a mixture of (a) sulfur, (b) acetylene, and (c) an amino compound having the formula HNR'R'' in which R' and R'' are identical with the same characters described above and thereafter separating the mixture of said thioacetamide and said dithiooxalodiamide.

2. The process of preparing a mixture of a thioacetamide and a dithiooxalodiamide having respectively the formulas

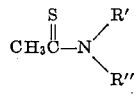

and

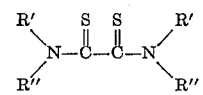

in which R' and R'' in all occurrences are the same members of the class consisting of hydrogen atoms and alkyl, cycloalkyl, and aralkyl radicals, which process comprises heating under anhydrous conditions at a temperature from 100° C. to 150° C. a mixture of (a) sulfur, (b) acetylene, and (c) an amino compound having the formula HNR'R'' in which R' and R'' are identical with the same characters described above and thereafter separating the mixture of said thioacetamide and said dithiooxalodiamide.

3. The process of preparing a mixture of a thioacetamide and a dithiooxalodiamide having respectively the formulas

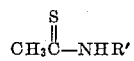

and

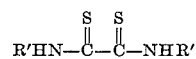

in which R' in all occurrences is the same alkyl group, which comprises heating under anhydrous conditions at a temperature from 80° C. to 300° C. a mixture of (a) sulfur, (b) acetylene, and (c) a primary amine, R'NH$_2$, in which R' is the same alkyl group described above, and thereafter separating the mixture of said thioacetamide and said dithiooxalodiamide.

4. The process of preparing a mixture of thioacetamide and a dithiooxalodiamide having respectively the formulas

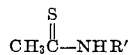

and

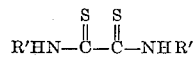

in which R' in all occurrences is the same cycloalkyl group, which comprises heating under anhydrous conditions at a temperature from 80° C. to 300° C. a mixture of (a) sulfur, (b) acetylene, and (c) a primary amine, R'NH$_2$, in which R' is the same cycloalkyl group described above, and thereafter separating the mixture of said thioacetamide and said dithiooxalodiamide.

5. The process of preparing a mixture of a thioacetamide and a dithiooxalodiamide having respectively the formulas

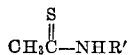

and

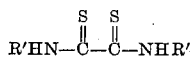

in which R' in all occurrences is the same aralkyl group, which comprises heating under anhydrous conditions at a temperature from 80° C. to 300° C. a mixture of (a) sulfur, (b) acetylene, and (c) a primary amine, R'NH₂, in which R' is the same aralkyl group described above, and thereafter separating the mixture of said thioacetamide and said dithiooxalodiamide.

6. The process of preparing a mixture of a thioacetamide and a dithiooxalodiamide having respectively the formulas

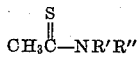

and

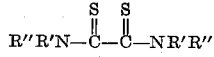

in which R' and R'' represent alkyl groups, which comprises heating under anhydrous conditions at a temperature from 80° C. to 300° C. a mixture of (a) sulfur, (b) acetylene, and (c) a secondary amine, R'R''NH, in which R' and R'' are the same alkyl groups described above, and thereafter separating the mixture of said thioacetamide and said dithiooxalodiamide.

7. The process of preparing a mixture of a thioacetamide and a dithiooxalodiamide having respectively the formulas

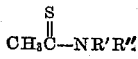

and

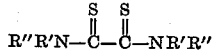

in which R' and R'' represent aralkyl groups, which comprises heating under anhydrous conditions at a temperature from 80° C. to 300° C. a mixture of (a) sulfur, (b) acetylene, and (c) a secondary amine, R'R''NH, in which R' and R'' are the same aralkyl groups described above, and thereafter separating the mixture of said thioacetamide and said dithiooxalodiamide.

CHARLES L. LEVESQUE.

REFERENCES CITED

The following references are of record in the file of this patent:

UNITED STATES PATENTS

| Number | Name | Date |
|---|---|---|
| 2,495,567 | Carmack et al. | Jan. 24, 1950 |

OTHER REFERENCES

King et al., "J. Am. Chem. Soc.," vol. 68, April 1946, pp. 632 and 633.

Carmack et al., "J. Am. Chem. Soc.," vol. 68, Oct. 1946, pp. 2029 to 2033.

Pattison et al., "J. Am. Chem. Soc.," vol. 68, Oct. 1946, pp. 2033 to 2035.